(12) United States Patent
Dortmund et al.

(10) Patent No.: US 9,787,742 B2
(45) Date of Patent: Oct. 10, 2017

(54) OPTIMIZING SYNCHRONIZATION OF AUDIO AND NETWORK TASKS IN VOICE OVER PACKET SWITCHED NETWORKS

(71) Applicant: Intel Corporation, Santa Clara, CA (US)

(72) Inventors: Sven Dortmund, Essen (DE); David Giguet, Toulouse (FR); Benoit Guilhaumon, Toulouse (FR); Eric Perraud, Plaisance du touch (FR); Philippe Weingertner, Fayence (FR); Jerome Parron, Fuerth (DE)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 14/500,119

(22) Filed: Sep. 29, 2014

(65) Prior Publication Data

US 2016/0094605 A1    Mar. 31, 2016

(51) Int. Cl.
*H04W 4/00* (2009.01)
*H04L 29/06* (2006.01)
*H04W 56/00* (2009.01)

(52) U.S. Cl.
CPC ........... *H04L 65/602* (2013.01); *H04W 56/00* (2013.01)

(58) Field of Classification Search
CPC ............... H04W 56/00; H04W 84/042; H04W 72/0446; H04W 72/04; H04L 65/602; H04L 67/325; H04L 29/06; H04L 29/08
See application file for complete search history.

(56) References Cited

U.S. PATENT DOCUMENTS

| | | | |
|---|---|---|---|
| 2003/0043856 A1* | 3/2003 | Lakaniemi | H04J 3/0632 370/503 |
| 2007/0258700 A1 | 11/2007 | Ivashin et al. | |
| 2011/0257964 A1* | 10/2011 | Rathonyi | H04J 3/0697 704/201 |

(Continued)

FOREIGN PATENT DOCUMENTS

| | | |
|---|---|---|
| WO | WO-2011128141 A1 | 10/2011 |
| WO | WO-2016053630 A1 | 4/2016 |

OTHER PUBLICATIONS

"3GPP TSG-SA4#77: Updated delay Profiles for ART_LTE-UED", S4-140197, (Jan. 2014), 4 pgs.

(Continued)

*Primary Examiner* — Yemane Mesfin
*Assistant Examiner* — Abdelillah Elmejjarmi
(74) *Attorney, Agent, or Firm* — Schwegman Lundberg & Woessner, P.A.

(57) ABSTRACT

A user equipment device (UE) comprises physical layer circuitry configured to transmit and receive radio frequency electrical signals with one or more nodes of a radio access network, an audio subsystem configured to generate frames of audio data, and processing circuitry. The processing circuitry is configured to calculate a time delay from generation of an audio data frame by the audio subsystem of the UE device to transmission of an audio data packet by the physical layer circuitry during a voice call, and decrease the time delay to a delay value that preserves a specified minimum time for delivery of the generated audio data frame to the physical layer circuitry to meet a scheduled transmission time of the audio data packet.

20 Claims, 5 Drawing Sheets

(56) References Cited

U.S. PATENT DOCUMENTS

2013/0039238 A1 2/2013 Santos Barreto et al.
2013/0343265 A1* 12/2013 Ehsan .................. H04J 3/0632
370/328

OTHER PUBLICATIONS

"International Application Serial No. PCT/US2015/050500, International Search Report mailed Jan. 12, 2016", 3 pgs.
"International Application Serial No. PCT/US2015/050500, Written Opinion mailed Jan. 12, 2016", 7 pgs.
"TSG SA4 SQ Ad-Hoc Meeting: Delay variations in LTE", Tdoc-AHQ074, (Oct. 2013), 11 pgs.

* cited by examiner

OPTIMIZING SYNCHRONIZATION OF AUDIO AND NETWORK TASKS IN VOICE OVER PACKET SWITCHED NETWORKS

TECHNICAL FIELD

Embodiments pertain to transmitting packetized voice data using radio access networks. Some embodiments relate to voice over internet protocol (VoIP) or voice over long term evolution protocol (VoLTE).

BACKGROUND

Radio access networks are used for delivering voice communications to user equipment such as a cellular telephone or a smart phone. Some radio networks are packet switched networks and packetize the voice data when it is sent over the network. Packetizing voice information and routing packetized voice data can introduce latency into voice communications that impacts the quality of the communications provided by the network. Latency refers to the time between collecting voice data during a phone call to when the voice data reaches the destination. This latency can lead to delay and can impact the conversation quality of the voice call. Thus, there are general needs for devices, systems and methods that provide a robust protocol for communication with user equipment and yet minimize delay in end-to-end voice communications.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
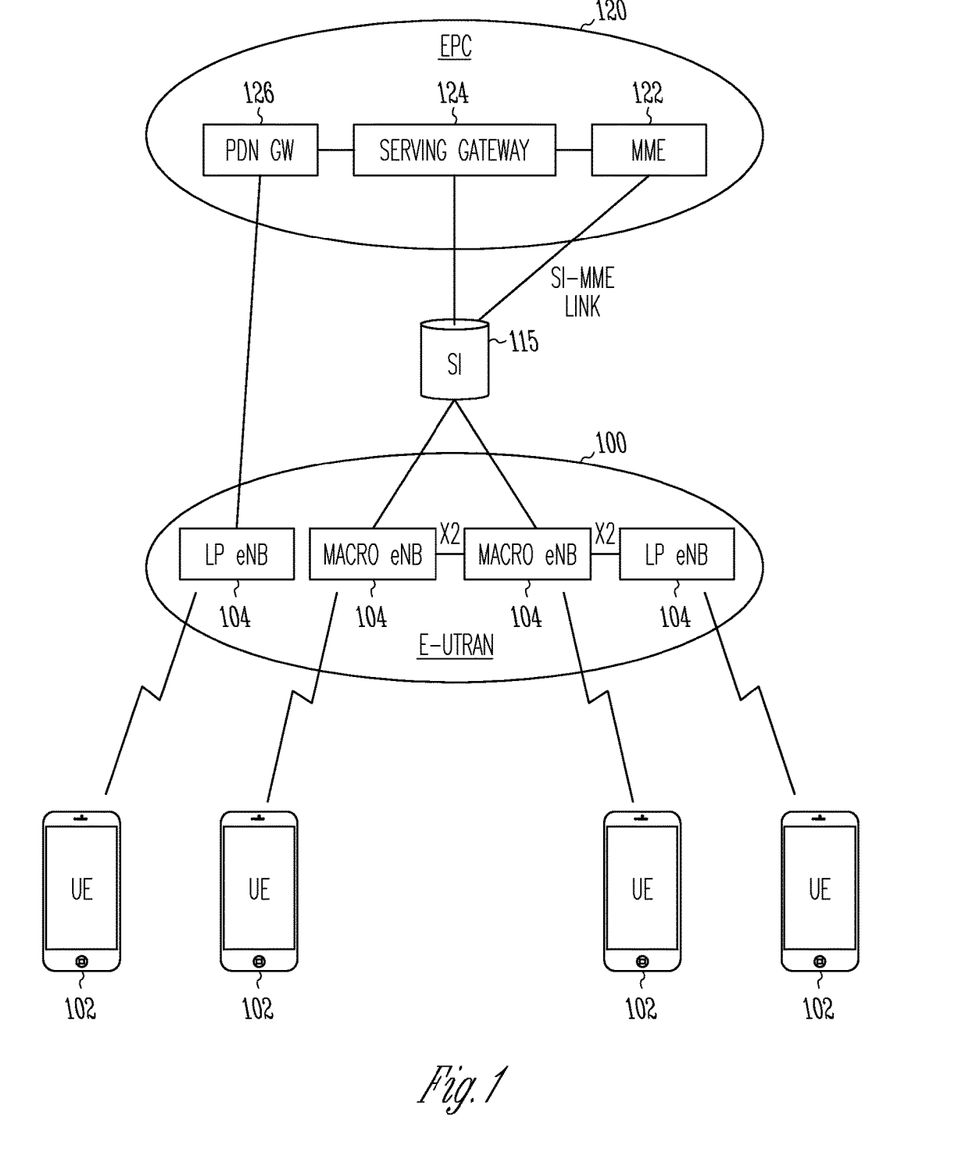
FIG. 1 shows an example of a portion of an end-to-end network architecture of an LTE network with various components of the network in accordance with some embodiments.

FIG. 1 shows an example of a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity, only a portion of the core network 120, as well as the RAN 100, is shown in the example.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a microcell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. Two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

As explained previously, forming voice information into packetized data and routing the packetized voice data over a network can introduce latency into voice communications. The inventors have recognized that the uplink of voice information in the UE can have a significant impact on the latency. For example, lack of synchronization between the audio processing tasks and the transmission scheduling tasks of the UE can introduce delay into end-to-end voice communications. Improving this synchronization can reduce latency in voice communication.

Figure 2:
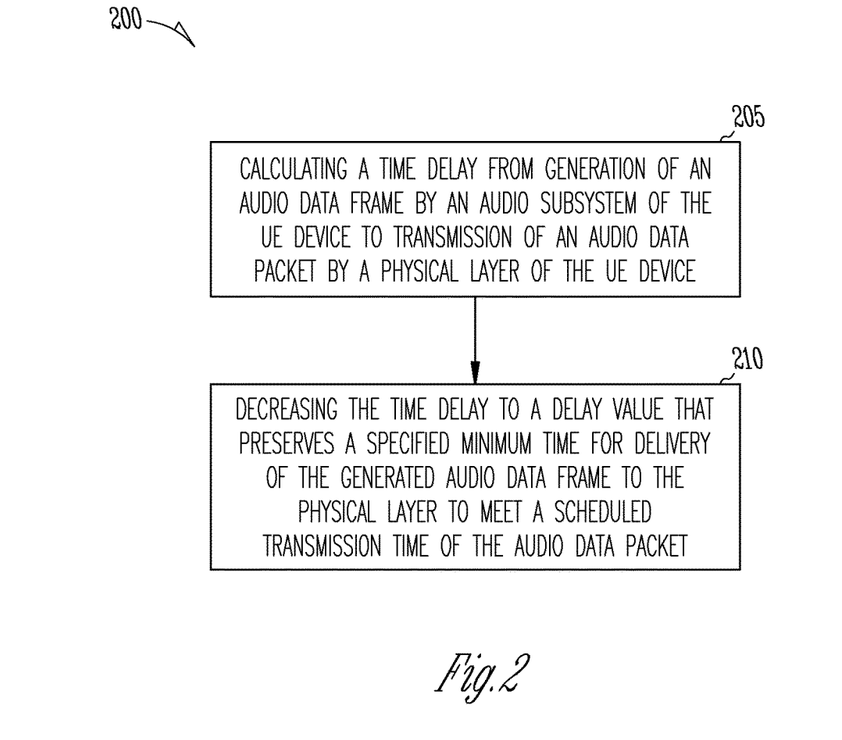
FIG. 2 shows a flow diagram of an example of a method of reducing delay in the uplink of voice information in a radio access network in accordance with some embodiments.

FIG. 2 shows a flow diagram of an example of a method 200 of reducing delay in the uplink of voice information in a radio access network. At 205, a time delay is calculated. The time delay includes the time duration from the generation of an audio data frame by an audio subsystem of the UE device to transmission of an audio data packet by the physical layer of the UE device during a voice call.

Figure 3A:
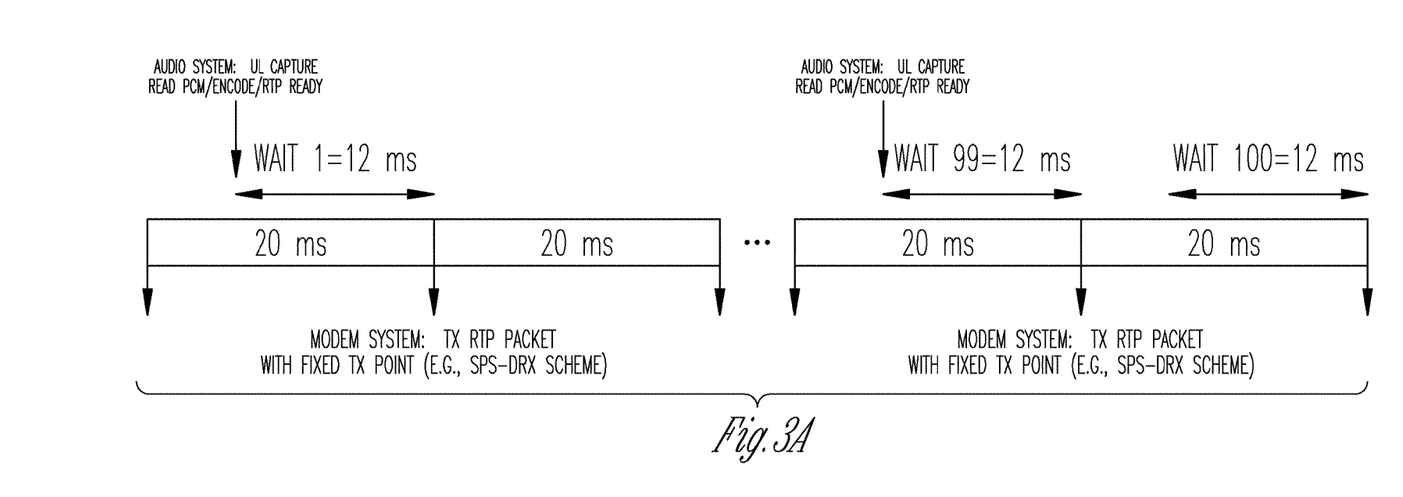
FIGS. 3A and 3B illustrate an example of determining and reducing the delay in the uplink of voice information in a radio access network in accordance with some embodiments.

FIG. 3A illustrates an example of determining the time delay. At 305, the audio subsystem of a UE has generated audio data from a voice call. The UE may generate the audio data by digitizing voice information as pulse code modulation (PCM) samples. At 305, the voice call audio data is encoded and formed into one or more packets, such as according to a real time protocol (RTP) for example. In the example shown in FIG. 3, there is a 20 millisecond (20 ms) time period between transmitting the packets and the audio data frames are available 12 ms ahead of the next packet transmit time. Thus, there is a 12 ms time delay from the time that the audio data frame is generated to the time that the audio data packet begins to be transmitted. The example in FIG. 3A shows that the time period between audio data packets remains the same for a series of 100 audio data packets and the time delay remains 12 ms for the 100 audio data packets. The time delay can be calculated or measured any time during the call including the beginning or initiation of the call and while the call is active and ongoing.

Figure 3B:
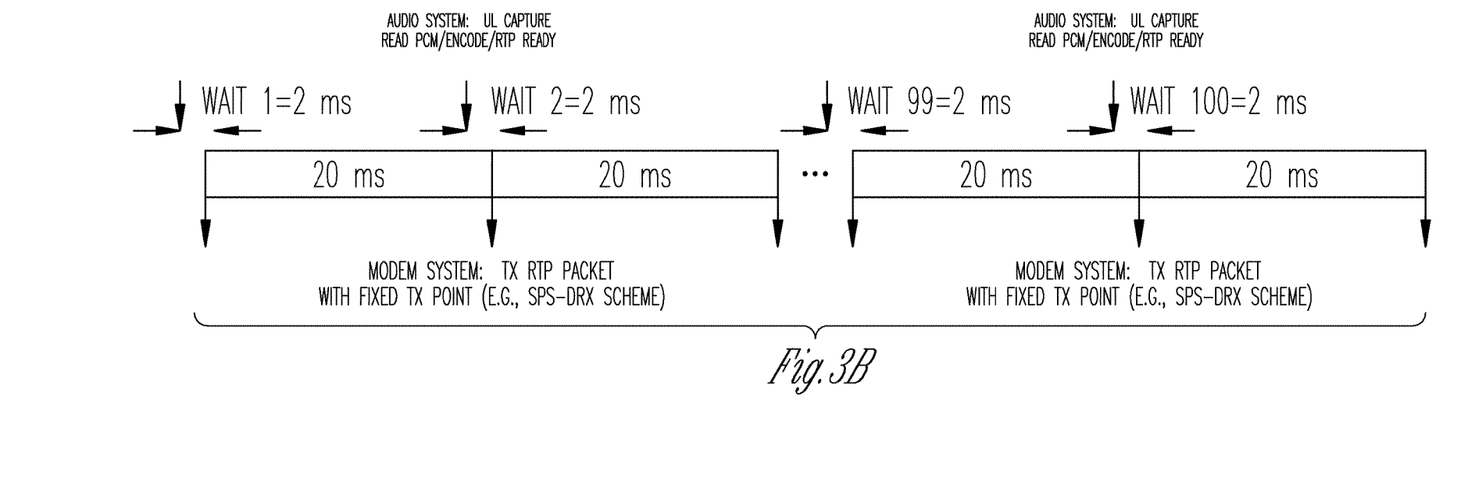

Referring to FIG. 2 at 210, the time delay is decreased to a delay value that preserves a specified minimum time for delivery of the generated the audio data frame to the physical layer to meet a scheduled transmission time of the audio data packet. This specified minimum time can be referred to as a watermark. FIG. 3B illustrates an example of decreasing the time delay. The generation of the audio data and the time for transmitting the audio data are synchronized to occur closer together. The time delay or wait time is the time from delivery of the audio data frame to the earliest forthcoming uplink grant. In the example, the time delay is reduced to 2 ms. The time between production of audio data packets and consumption of the packets is made as small as possible to minimize end-to-end latency. A small non-zero time delay is maintained as the watermark to avoid the situation where the audio data generating happens later than the scheduled time for transmission.

Figure 4:
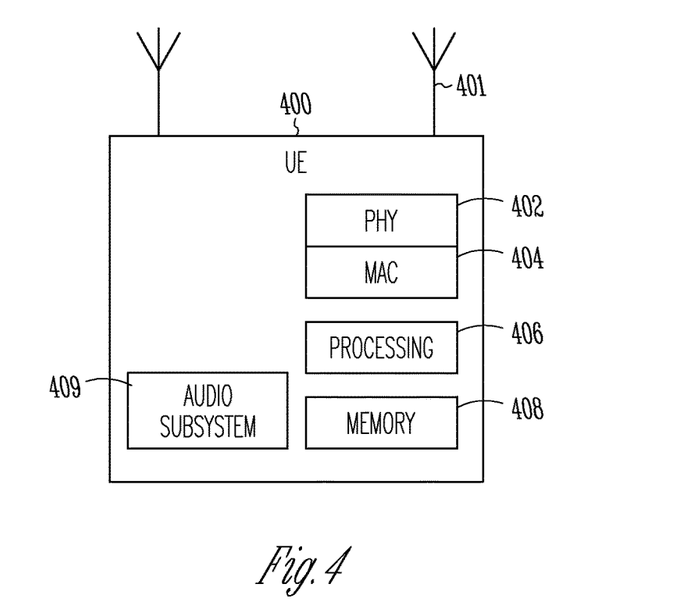
FIG. 4 shows a functional block diagram of an example of a UE in accordance with some embodiments.

FIG. 4 illustrates a functional block diagram of a UE in accordance with some embodiments. The UE 400 may be suitable for use as any one or more of the UEs 102 illustrated in FIG. 1. The UE 400 may include physical layer (PHY) circuitry 402 for transmitting and receiving radio frequency electrical signals to and from one or more nodes of a radio access network such as eNBs 104 (FIG. 1) using one or more antennas 401. The PHY circuitry 402 may include circuitry for modulation/demodulation, upconversion/downconversion, filtering, amplification, etc. UE 400 may also include medium access control layer (MAC) circuitry 404 for controlling access to the wireless medium and to configure frames or packets for communicating over the wireless medium. UE 400 may also include processing circuitry 406 and memory 408 arranged to configure the various elements of the UE to perform the operations described herein. The memory 408 may be used to store information for configuring the processing circuitry 406 to perform the operations. The UE may include an audio subsystem 409. The audio subsystem may include an audio codec to digitize voice information and to receive and decode audio information. The audio subsystem 409 generates frames of audio data using the digitized voice information produced by the audio codec.

In some embodiments, the UE 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 400 may include one or more of a keyboard, a display, a non-volatile memory port, multiple antennas, a graphics processor, an application processor, speakers, and other mobile device elements. The display may be an LCD screen including a touch screen.

The one or more antennas 401 utilized by the UE 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 400 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network or a high speed downlink/uplink access (HSDPA/HSUPA) communication network, although the scope of the invention is not limited in this respect.

The processing circuitry 406 is configured (e.g., by one or a combination of hardware, firmware and software) to calculate a time delay from generation of an audio data frame by the audio subsystem 409 to transmission of an audio data packet by the physical layer circuitry 402 during a voice call, including the beginning or initiation of the voice and while the voice call is ongoing. The processing circuitry 406 decreases the time delay to a delay value that preserves a specified minimum time for delivery of the generated audio data frame to the physical layer circuitry to meet a scheduled transmission time of the audio data packet.

According to some embodiments, the processing circuitry 406 is configured to calculate a target synchronization value (e.g., a TXALIGN value having units of ms) using the calculated time delay. The time delay between generation of an audio data frame and transmission of an audio data packet is reduced by target synchronization value, but a small non-zero time delay is preserved so that any delay in scheduling the UL audio activities will not result in a delivery of audio data that is later than the UL transmission time. Referring to the example shown in FIGS. 3A and 3B, the value of the target synchronization value is 10 ms and the value of the preserved time delay is 2 ms. In some embodiments, statistics of the uplink is tracked and the value of the target synchronization value is calculated using the statistics. For example, the processing circuitry 460 may determine a central tendency (e.g., average) of the time delay over at least a portion of the 100 samples shown in the example of FIGS. 3A and 3B and calculate the target synchronization value using the central tendency time delay. In certain variations, statistics of the time delay may be collected over a sliding window of samples (e.g., (100-200 samples). In certain variations, the time delay is determined by fixed network parameters.

Once the value of the target synchronization value is determined at the beginning or during the phone call, it is desirable to adjust the delay during operation of the device (e.g., on the fly) without requiring a stop and restart of the UE or a reconfiguration of the UE. In some embodiments, the processing circuitry 406 initiates discarding of a number of PCM samples equal to the target synchronization value to decrease the time delay. In the example of FIGS. 3A and 3B, the duration of a speech frame is 20 ms and includes a number of PCM samples. If 10 ms of PCM samples are dropped, the time delay can be decreased from 12 ms to 2 ms. The uplink capture of audio data is shifted by the number of dropped PCM samples. Afterwards, PCM samples are read for the duration of a speech frame as usual and have the same periodicity.

When identifying PCM to be discarded, it is desired that PCM samples corresponding to no speech activity (e.g., silence) during the call are the PCM samples selected for discarding. In certain embodiments, the processing circuitry 406 may detect a PCM sample that corresponds to no speech activity by determining that a detected level of energy in the PCM sample is less than a specified minimum energy level threshold. The energy level of a PCM sample may be less than a specified energy level when the magnitudes of the digitized values are less than a threshold magnitude. In certain embodiments, the processing circuitry 406 may detect a PCM sample that corresponds to no speech activity by determining that a number of zero-crossings in the PCM sample is greater than a specified zero-crossing threshold number.

According to some embodiments, if PCM samples corresponding to no speech activity are not available, the synchronization by the discarding of PCM samples is postponed to a future time when PCM samples corresponding to no speech activity are available. If no PCM samples corresponding to no speech activity are available for a significant amount of time, the synchronization may be forced by discarding PCM samples of speech activity. In some embodiments, the processing circuitry 406 times a specified timeout duration during the voice call and initiates discarding of a specified number of PCM samples corresponding to speech activity when PCM samples corresponding to no speech activity are undetected upon expiration of the timeout duration.

Figure 5:
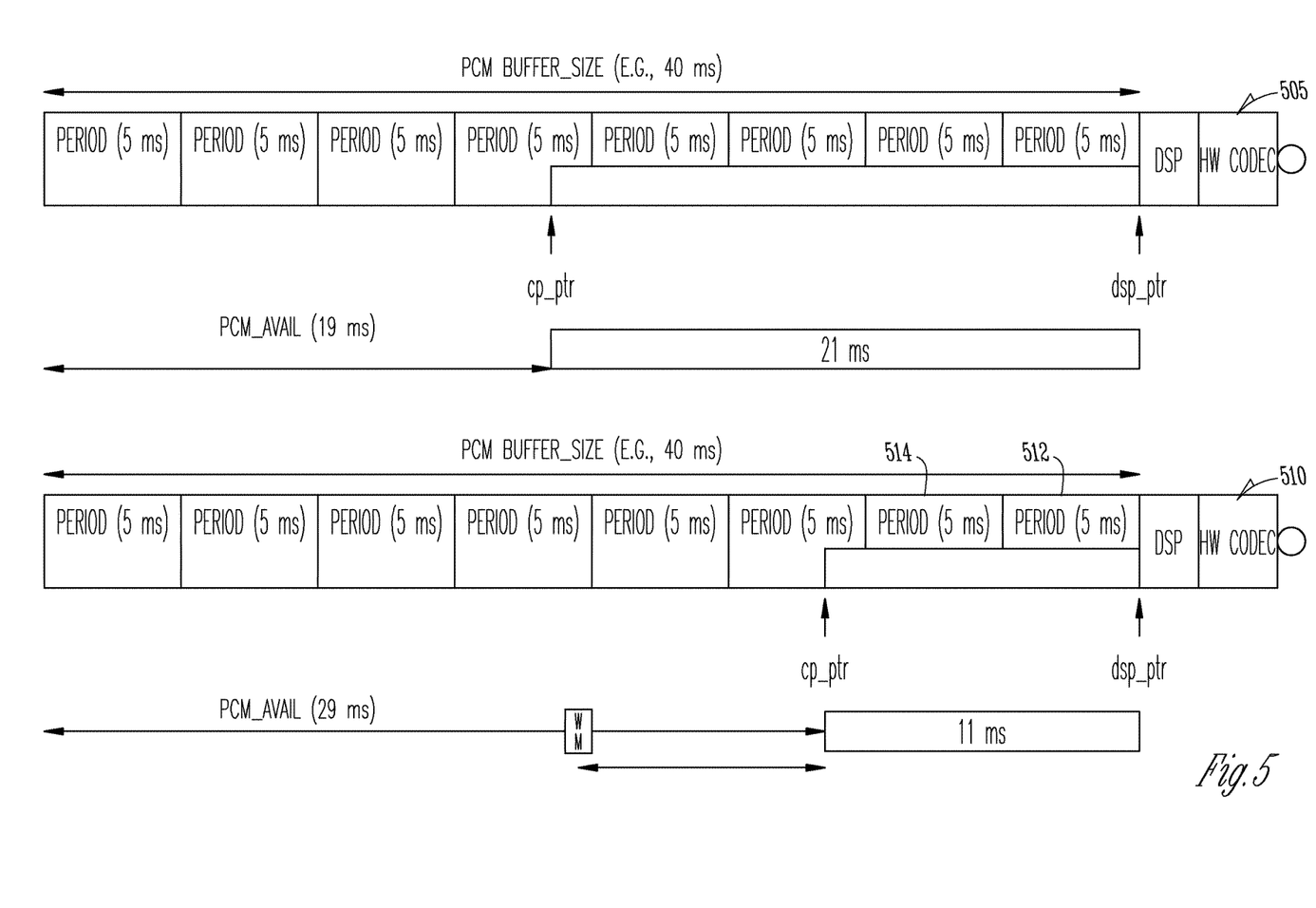
FIG. 5 illustrates another example of reducing delay in the uplink of voice information in radio access network in accordance with some embodiments.

FIG. 5 illustrates another example of reducing delay in the uplink of voice information in radio access network. The delay is reduced by aligning the network uplink closer to the generation of the audio data. The example shows a sequence of events from right to left for the uplink audio processing chain. PCM samples are generated and placed in a PCM buffer. In the example shown, a DSP may retrieve audio data every 5 ms. Depending on the implementation, the granularity of the data retrieval may be 1 ms, 5 ms, 10 ms, or even 20 ms. A smaller granularity size may improve the alignment of the audio process with the network operation. The buffer size in the example is 40 ms or 8 samples of 5 ms. The top sequence 505 shows normal operation of the uplink process. The duration of a speech frame of the example is 20 ms, but the duration may depend on the implementation. A wakeup signal for uplink capture is generated every speech frame period.

The bottom sequence 510 shows operation to align the uplink with the generation of audio data. The target synchronization value has already been determined to be 10 ms. The object is to identify two samples of no speech activity to match the target value of 10 ms and discard them. After the duration of a speech frame a number of samples corresponding to the target value (two samples in this example) are analyzed to determine if they represent no speech activity. When the samples are identified, a wakeup for the uplink capture is generated 10 ms earlier (the target synchronization value time) instead of at the speech frame time. Two PCM samples 512 and 514 are dropped. PCM samples are then read as usual. The result is that the uplink is aligned 10 ms closer to the delivery the of audio data packet.

Additional opportunities for reducing the latency in end-to-end voice communications may be available depending on the communication protocol used by the radio access network. When new data is available in an LTE type protocol (e.g., a third generation partnership project (3GPP) type protocol) a scheduling request (SR) is sent to the network to access the required network resource. An On Duration is then timed that corresponds to a number of subframes at the start of a discontinuous reception (DRX) cycle. Following the On Duration is a period of possible inactivity during which the new data may be transmitted. New data detection may be performed by the MAC layer circuitry of the UE when data is received from the upper layers of the UE (e.g., from the audio subsystem). Upon reception of the new audio data, the MAC layer circuitry sends an indication to the PHY layer to transmit the SR to schedule the audio data frame for transmission. Transmission of the audio data frame follows reception of an uplink (UL) grant from the network.

The uplink delay can be reduced by anticipating the arrival of new audio data and sending the SR prior to the availability of new audio data. Determining the periodicity of the audio data allows the MAC layer circuitry to trigger the sending of the SR before the audio data is actually present at the MAC layer circuitry. The latency in end-to-end voice communication is reduced by the amount of time between the sending of the SR and the reception of the corresponding uplink (UL) grant.

Figure 6:
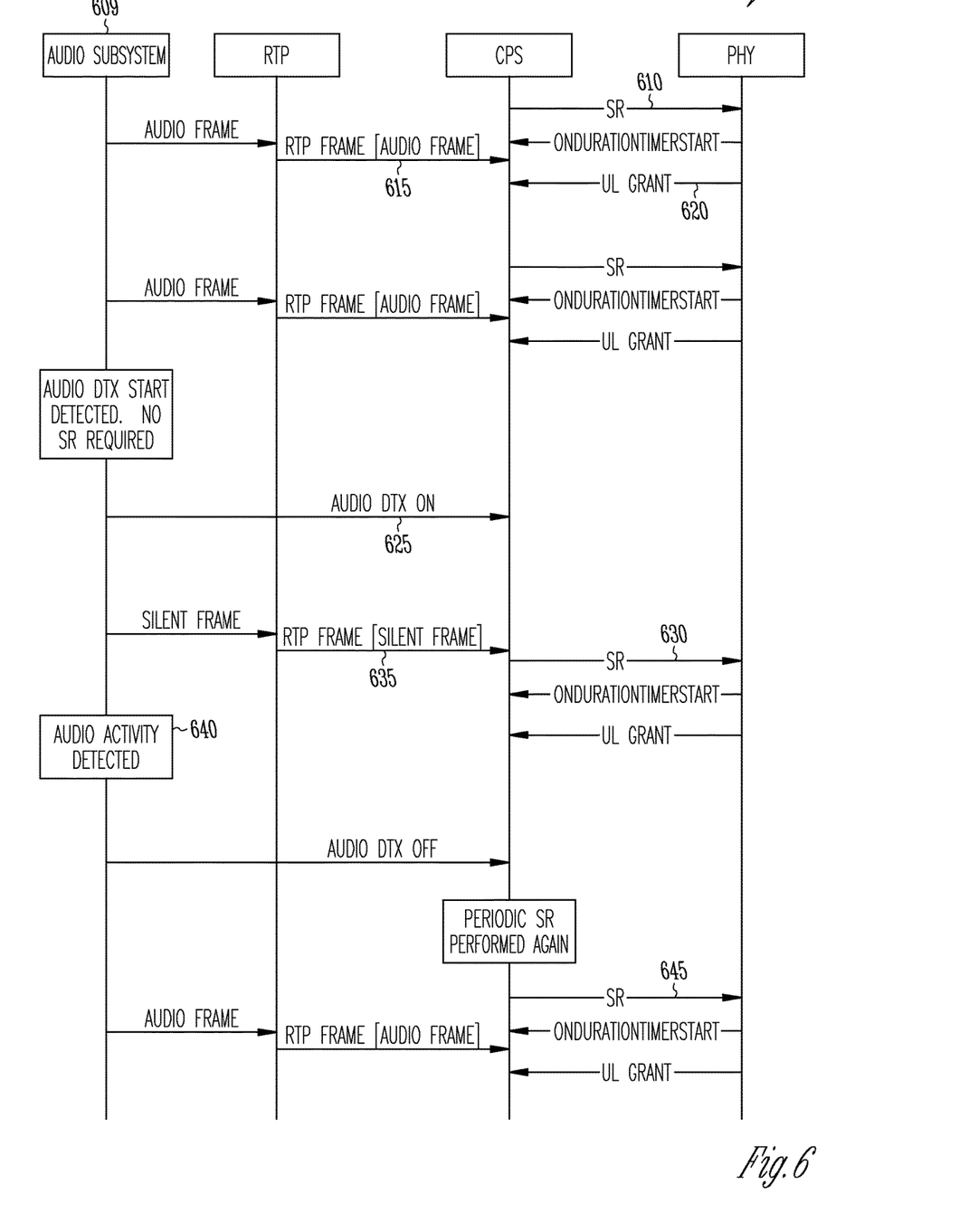
FIG. 6 illustrates still another example of reducing delay in the uplink of voice information in radio access network in accordance with some embodiments.

FIG. 6 illustrates a timing diagram 600 of still another example of reducing delay in the uplink of voice information in radio access network. The example relates to the timing of the automated sending request of a VoLTE call. In the diagram, time flows from the top of FIG. 6 to the bottom. The processing circuitry 406 of FIG. 4 may determine the periodicity of new audio frames being generated by the audio subsystem 609. The processing circuitry decreases the time duration between the generating of the audio data frame and a time slot scheduled for the transmission of the audio data frame.

According to some embodiments, the time slot is scheduled according to a connected discontinuous reception mode (C-DRX) with dynamic scheduling. In certain examples, the time slot is scheduled according to a semi-persistent scheduling (SPS) pattern. The time slot for transmission corresponds to an expected UL grant time. As shown in the example of FIG. 6, the time duration is decreased by the cellular protocol specification (CPS) triggering the SR 610 in anticipation of the delivery of the audio frame packet 615 according to a real time protocol (RTP). In some embodiments, the MAC layer circuitry sends the indication to the PHY layer circuitry to transmit a SR to schedule transmission of the audio data frame before the MAC layer circuitry receives the audio frame from the audio subsystem. In the example shown in FIG. 6, the MAC layer circuitry sends the indication to the PHY layer circuitry to transmit a SR to schedule transmission of the audio data frame before the audio subsystem generates the audio frame. Reducing the latency can include preserving a specified minimum time between delivery of the audio frame packet 615 and the expected UL grant time.

In the case of audio silence (audio DTX) 625 during a voice call, no audio data needs to be transmitted. The processing circuitry of the UE may disable the sending of the SR prior to delivery of new audio data. As shown in FIG. 6, the SR is sent 630 to the network to access the required resource after delivery 635 of the frame packet. When audio activity is again detected 640, the early sending 645 of the SR in anticipation of new audio data is resumed. The advantage of sending an early SR may depend on the network configuration. In certain embodiments, the early sending of SR is enabled according to the quality of service of the UE, such as when the UE is used for internet protocol multimedia system (IMS) for voice for example.

The several examples provided describe reduction in latency in a radio access network such as by voice over internet protocol (VoIP) for example. The latency is reduced by reducing the delay in the uplink of voice data to the communication network. This can reduce the occurrence of delay and echo during a voice call.

ADDITIONAL NOTES AND EXAMPLES

Example 1 can include subject matter (such as a user equipment device) comprising physical layer circuitry configured to transmit and receive radio frequency electrical signals with one or more nodes of a radio access network, an audio subsystem configured to generate frames of audio data, and processing circuitry. The processing circuitry is configured to calculate a time delay from generation of an audio data frame by the audio subsystem of the UE device to transmission of an audio data packet by the physical layer circuitry during a voice call, including a beginning of the voice call and when the voice call is active, and to decrease the time delay to a delay value that preserves a specified minimum time for delivery of the generated audio data frame to the physical layer circuitry to meet a scheduled transmission time of the audio data packet.

In Example 2, the subject matter of Example 1 can optionally include processing circuitry configured to initiate discarding of one or more PCM samples by the audio subsystem during the voice call to decrease the time delay between the audio data frame generation and the transmission of the audio data packet.

In Example 3, the subject matter of one or a combination of Examples 1-2, can optionally include processing circuitry configured to detect one or more PCM samples corresponding to no speech activity and to initiate discarding of one or more of the detected PCM samples.

In Example 4, the subject matter of one or any combination of Examples 1-3 can optionally include processing circuitry configured to calculate a target synchronization value using the calculated time delay and to initiate discarding of a number of PCM samples equal to the target synchronization value to decrease the time delay.

In Example 5, the subject matter of Example 4 can optionally include processing circuitry configured to determine a central tendency time period in which audio frames are generated by the audio subsystem and calculate the target synchronization value using the central tendency time period.

In Example 6, the subject matter of one or any combination of Examples 1-5 can optionally include processing circuitry configured to time a specified timeout duration during the voice call and initiate discarding of a specified number of PCM samples corresponding to speech activity when PCM samples corresponding to no speech activity are undetected upon expiration of the timeout duration.

In Example 7, the subject matter of one or any combination of Examples 1-6 can optionally include processing circuitry configured to decrease a time duration between the generating of the audio data frame and a time slot scheduled for the transmission of the audio data frame.

In Example 8, the subject matter of Example 7 can optionally include the time slot scheduled according to a connected discontinuous reception mode (C-DRX) with dynamic scheduling, wherein the time slot corresponds to an expected uplink grant time.

In Example 9, the subject matter of one or any combination of Examples 7-8 can optionally include the time slot scheduled according to a semi-persistent scheduling (SPS) pattern.

In Example 10, the subject matter of one or any combination of Examples 7-9 can optionally include MAC layer circuitry configured to send an indication to the physical layer circuitry to transmit a scheduling request to schedule transmission of the audio data frame before the MAC layer circuitry receives the audio frame from the audio subsystem.

In Example 11, the subject matter of one or any combination of Examples 7-10 can optionally include MAC layer circuitry configured to send an indication to the physical layer circuitry to transmit a scheduling request to schedule transmission of the audio data frame before the audio subsystem generates the audio frame.

In Example 12, the subject matter of one or any combination of Examples 1-11 can optionally include the radio network including a cellular telephone network.

In Example 13, the subject matter of one or any combination of Examples 1-12 can optionally include a UE configured to communicate data using at least one of a voice over long term evolution (VoLTE) protocol or a high speed downlink/uplink access (HSDPA/HSUPA) protocol.

Example 14 can include subject matter (such as a method, a means for performing acts, or a machine-readable medium including instructions that, when performed by the machine, cause the machine to perform acts), or can optionally be combined with the subject matter of one or any combination of Examples 1-13 to include such subject matter, comprising calculating a time delay from generation of an audio data frame by an audio subsystem of the UE device to transmission of an audio data packet by a physical layer of the UE device during a voice call, including a beginning of the voice call and when the voice call is active, and decreasing the time delay to a delay value that preserves a specified minimum time for delivery of the generated audio data frame to the physical layer to meet a scheduled transmission time of the audio data packet.

In Example 15, the subject matter of Example 14 can optionally include decreasing the device delay includes discarding one or more pulse code modulation (PCM) samples during the voice call to decrease the time delay between the audio data frame generation and the transmission of the audio data packet.

In Example 16, the subject matter of Example 15 can optionally include detecting one or more PCM samples corresponding to no speech activity and wherein discarding one or more PCM samples includes discarding the detected one or more PCM samples.

In Example 17, the subject matter of one or a combination of Examples 15 and 16 can optionally include calculating a target synchronization value using the calculated time delay, wherein discarding one or more PCM samples includes discarding a number of PCM samples equal to the target synchronization value.

In Example 18, the subject matter of one or any combination of Examples 14-17 can optionally include decreasing a time duration between the generating of the audio data frame and receiving an uplink (UL) grant.

In Example 19, the subject matter of one or any combination of Examples 14-18 can optionally include decreasing a time duration between the generating of the audio data frame and a time slot corresponding to a scheduled UL grant of a specified radio pattern.

In Example 20, the subject matter of one or any combination of Examples 14-19 can optionally include transmitting a scheduling request prior to the audio subsystem generating an audio data frame to be transmitted after receiving a requested UL grant.

Example 21 can include subject matter (such as a wireless communication system), or can optionally be combined with the subject matter of one or any combination of Examples 1-20 to include such subject matter, comprising physical layer circuitry configured to transmit and receive radio frequency electrical signals with one or more nodes of a radio access network, one or more antennas electrically coupled to the physical layer circuitry, an audio subsystem configured to generate frames of audio data, and processing circuitry. The processing circuitry is configured to calculate a time delay from generation of an audio data frame by the audio subsystem of the UE device to transmission of an audio data packet by the physical layer circuitry during a voice call, including a beginning of the voice call and when the voice call is active, and to decrease the time delay to a delay value that preserves a specified minimum time for delivery of the generated audio data frame to the physical layer circuitry to meet a scheduled transmission time of the audio data packet.

In Example 21, the subject matter of Example 20 can optionally include processing circuitry configured to detect one or more pulse code modulation (PCM) samples corresponding to no speech activity and initiate discarding of the detected one or more PCM samples by the audio subsystem during the voice call to decrease the time delay between the audio data frame generation and the transmission of the audio data packet.

In Example 22, the subject matter of one or a combination of Examples 20 and 21 can optionally include processing circuitry configured to calculate a target synchronization value using the calculated time delay and to initiate discarding of a number of the detected PCM samples equal to the target synchronization value.

In Example 23, the subject matter of one or any combination of Examples 20-22 can optionally include processing circuitry configured to calculate a target synchronization value using the calculated time delay and to initiate discarding of a number of the detected PCM samples equal to the target synchronization value.

In Example 24, the subject matter of one or any combination of Examples 20-23 can optionally include processing circuitry configured to decrease a time duration between the generating of one or more audio data frames and receiving a user equipment uplink (UL) grant from the physical layer circuitry and to initiate the sending of a scheduling request by the physical layer circuitry to schedule transmission of the audio data frame before the audio subsystem generates the audio frame.

Example 25 can include subject matter, or can optionally be combined with the subject matter of one or any combination of Examples 1-24 to include such subject matter, such as a computer readable storage medium including instructions that when performed by hardware processing circuitry of a wireless communication device cause the wireless communication device to: calculate a time delay from generation of an audio data frame by an audio subsystem of the wireless communication device to transmission of an audio data packet by a physical layer of the wireless communication device during a voice call, including a beginning of the voice call and when the voice call is active, and decrease the time delay to a delay value that preserves a specified minimum time for delivery of the generated the audio data frame to the physical layer to meet a scheduled transmission time of the audio data packet.

In Example 26, the subject matter of Example 25 can optionally include instructions that when executed by the hardware processing circuitry cause the wireless communication device to detect one or more pulse code modulation (PCM) samples corresponding to no speech activity and discard the detected one or more PCM samples during the voice call to decrease the device delay between the audio data frame generation and the transmission of the audio data packet.

In Example 27, the subject matter of one or a combination of Examples 25-26 can optionally include instructions that when executed by the hardware processing circuitry cause the wireless communication device to calculate a target synchronization value using the calculated time delay and discard a number of PCM samples equal to the target synchronization value.

In Example 28, the subject matter of one or any combination of Examples 25-27 can optionally include instructions that when executed by the hardware processing circuitry cause the wireless communication device to send a scheduling request to the physical layer to transmit an audio frame prior to the audio subsystem generating the audio frame.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A user equipment device (UE) comprising: physical layer circuitry configured to transmit and receive radio frequency electrical signals with one or more nodes of a radio access network; an audio subsystem configured to generate frames of audio data; and processing circuitry configured to:

calculate a time delay from generation of an audio data frame by the audio subsystem of the UE device to transmission of an audio data packet by the physical layer circuitry during a voice call, including a beginning of the voice call and when the voice call is active;

discard a number of pulse code modulation (PCM) samples by the audio subsystem during the voice call to decrease the time delay between the audio data frame generation and a scheduled transmission of the audio data packet, when the time delay is greater than the number of samples to be discarded, to a delay value that preserves a specified minimum time for delivery of the generated audio data frame to the physical layer circuitry to meet the scheduled transmission time of the audio data packet; and time a specified timeout duration during the voice call and initiate discarding of a specified number of PCM samples corresponding to speech activity when PCM samples corresponding to no speech activity are undetected upon expiration of the timeout duration.

2. The UE of claim 1, wherein the processing circuitry is configured to detect one or more PCM samples corresponding to no speech activity and to initiate discarding of one or more of the detected PCM samples.

3. The UE of claim 1, wherein the processing circuitry is configured to calculate a target synchronization value using the calculated time delay and to initiate discarding of a number of PCM samples equal to the target synchronization value to decrease the time delay.

4. The UE of claim 3, wherein the processing circuitry is configured to determine a central tendency time period in which audio frames are generated by the audio subsystem and calculate the target synchronization value using the central tendency time period.

5. A user equipment device (UE) comprising: physical layer circuitry configured to transmit and receive radio frequency electrical signals with one or more nodes of a radio access network; an audio subsystem configured to generate frames of audio data; and processing circuitry configured to:

calculate a time delay from generation of an audio data frame by the audio subsystem of the UE device to transmission of an audio data packet by the physical layer circuitry during a voice call, including a beginning of the voice call and when the voice call is active;

discard a number of pulse code modulation (PCM) samples by the audio subsystem during the voice call to decrease the time delay between the audio data frame generation and a scheduled transmission of the audio data packet, when the time delay is greater than the number of samples to be discarded, to a delay value that preserves a specified minimum time for delivery of the generated audio data frame to the physical layer circuitry to meet the scheduled transmission time of the audio data packet;

time a specified timeout duration during the voice call and initiate discarding of a specified number of PCM samples corresponding to speech activity when PCM samples corresponding to no speech activity are undetected upon expiration of the timeout duration; and send a request for uplink for transmission of the audio data frame prior to generation of the audio frame to decrease the time delay from generation of the audio data frame to transmission of the audio data frame to a delay value that preserves a specified minimum time for delivery of the generated audio data frame to the physical layer circuitry.

6. The UE of claim 5, wherein a time slot of the uplink is scheduled according to a connected discontinuous reception mode (C-DRX) with dynamic scheduling, wherein the time slot corresponds to an expected uplink grant time.

7. The UE of claim 5, wherein a time slot of the is scheduled according to a semi-persistent scheduling (SPS) pattern.

8. The UE of claim 5, including MAC layer circuitry configured to send an indication to the physical layer circuitry to transmit a scheduling request to schedule transmission of the audio data frame before the MAC layer circuitry receives the audio frame from the audio subsystem.

9. The UE of claim 5, including MAC layer circuitry configured to send an indication to the physical layer circuitry to transmit a scheduling request to schedule transmission of the audio data frame before the audio subsystem generates the audio frame.

10. The UE of claim 1, wherein the radio network includes a cellular telephone network.

11. The UE of claim 10, wherein the UE is configured to communicate data using at least one of a voice over long term evolution (VoLTE) protocol or a high speed downlink/uplink access (HSDPA/HSUPA) protocol.

12. A method of operating a UE device of an end-to-end communication network, the method comprising:

calculating a time delay from generation of an audio data frame by an audio subsystem of the UE device to transmission of an audio data packet by a physical layer of the UE device during a voice call, including a beginning of the voice call and when the voice call is active;

discarding one or more pulse code modulation (PCM) samples by the audio subsystem during the voice call to decrease the time delay between the audio data frame generation and a scheduled transmission of the audio data packet, when the time delay is greater than the number of samples to be discarded, to a delay value that preserves a specified minimum time for delivery of the generated audio data frame to the physical layer to meet the scheduled transmission time of the audio data packet; and timing a specified timeout duration during the voice call and initiate discarding of a specified number of PCM samples corresponding to speech activity when PCM samples corresponding to no speech activity are undetected upon expiration of the timeout duration.

13. The method of claim 12, wherein decreasing the time delay includes decreasing a time duration between the generating of the audio data frame and receiving an uplink (UL) grant.

14. The method of claim 12, wherein decreasing the time delay includes decreasing a time duration between the generating of the audio data frame and a time slot corresponding to a scheduled UL grant of a specified radio pattern.

15. The method of claim 12, wherein decreasing the time delay includes transmitting a scheduling request prior to the audio subsystem generating an audio data frame to be transmitted after receiving a requested UL grant.

16. A wireless communication system comprising: physical layer circuitry configured to transmit and receive radio frequency electrical signals with one or more nodes of a radio access network; one or more antennas electrically coupled to the physical layer circuitry; an audio subsystem configured to generate frames of audio data; processing circuitry configured to:

calculate a time delay from generation of an audio data frame by the audio subsystem to transmission of an audio data packet by the physical layer circuitry during a voice call, including a beginning of the voice call and when the voice call is active;

discard a number of pulse code modulation (PCM) samples by the audio subsystem during the voice call to decrease the time delay between the audio data frame generation and a scheduled transmission of the audio data packet, when the time delay is greater than the number of samples to be discarded, to a delay value that preserves a specified minimum time for delivery of the generated audio data frame to the physical layer circuitry to meet the scheduled transmission time of the audio data packet;

time a specified timeout duration during the voice call and initiate discarding of a specified number of PCM samples corresponding to speech activity when PCM samples corresponding to no speech activity are undetected upon expiration of the timeout duration; and initiate sending of a scheduling request by the physical layer circuitry to schedule an uplink for transmission of the audio data frame before generation of the audio data frame to decrease a time duration between the generating of one or more audio data frames and receiving a user equipment uplink (UL) grant from the physical layer circuitry.

17. The wireless communication system of claim 16, wherein the processing circuitry is configured to detect one or more pulse code modulation (PCM) samples corresponding to no speech activity and initiate discarding of the detected one or more PCM samples by the audio subsystem during the voice call to decrease the time delay between the audio data frame generation and the transmission of the audio data packet.

18. The wireless communication system of claim 17, wherein the processing circuitry is configured to calculate a target synchronization value using the calculated time delay and to initiate discarding of a number of the detected PCM samples equal to the target synchronization value.

19. A non-transitory computer readable storage medium including instructions that when executed by hardware processing circuitry of a wireless communication device cause the wireless communication device to:

calculate a time delay from generation of an audio data frame by an audio subsystem of the wireless communication device to transmission of the audio data frame by a physical layer of the wireless communication device during a voice call, including a beginning of the voice call and when the voice call is active;

discard a number of pulse code modulation (PCM) samples by the audio subsystem during the voice call to decrease the time delay between the audio data frame generation and a scheduled transmission of the audio data packet, when the time delay is greater than the number of samples to be discarded, to a delay value that preserves a specified minimum time for delivery of the generated audio data frame to the physical layer circuitry to meet the scheduled transmission time of the audio data packet;

time a specified timeout duration during the voice call and initiate discarding of a specified number of PCM samples corresponding to speech activity when PCM samples corresponding to no speech activity are undetected upon expiration of the timeout duration; and send a scheduling request to the physical layer for an uplink to transmit an audio data frame prior to generation of the audio data frame to decrease the time delay to a delay value that preserves a specified minimum time for delivery of the generated the audio data frame to the physical layer to meet a scheduled transmission time of the audio data frame.

20. The non-transitory computer readable storage medium of claim 19, including instructions that when executed by the hardware processing circuitry cause the wireless communication device to detect one or more pulse code modulation (PCM) samples corresponding to no speech activity and discard the detected one or more PCM samples during the voice call to decrease the device delay between the audio data frame generation and the transmission of the audio data frame.

* * * * *

UNITED STATES PATENT AND TRADEMARK OFFICE
CERTIFICATE OF CORRECTION

PATENT NO. : 9,787,742 B2
APPLICATION NO. : 14/500119
DATED : October 10, 2017
INVENTOR(S) : Dortmund et al.

It is certified that error appears in the above-identified patent and that said Letters Patent is hereby corrected as shown below:

In the Claims

In Column 12, Line 55, in Claim 1, after "comprising:", insert --¶--

In Column 12, Line 58, in Claim 1, after "network;", insert --¶--

In Column 12, Line 59, in Claim 1, after "and", insert --¶--

In Column 13, Line 28, in Claim 5, after "comprising:", insert --¶--

In Column 13, Line 31, in Claim 5, after "and", insert --¶--

In Column 13, Line 32, in Claim 5, after "and", insert --¶--

In Column 13, Line 65, in Claim 7, after "the", insert --uplink--

In Column 14, Line 53, in Claim 16, after "comprising:", insert --¶--

In Column 14, Line 56, in Claim 16, after "network;", insert --¶--

In Column 14, Line 57, in Claim 16, after "circuitry;", insert --¶--

In Column 14, Line 58, in Claim 16, after "data;", insert --and¶--

Signed and Sealed this
Twenty-eighth Day of May, 2019

Andrei Iancu
*Director of the United States Patent and Trademark Office*